United States Patent [19]

Masuishi et al.

[11] Patent Number: 4,903,215
[45] Date of Patent: Feb. 20, 1990

[54] INFERENCE METHOD

[75] Inventors: Tetsuya Masuishi, Machida; Hiroshi Tsuji, Kawasaki; Chizuko Yasunobu, Yokohama; Hideo Ohata, Machida, all of Japan

[73] Assignee: Hitachi Ltd., Tokyo, Japan

[21] Appl. No.: 122,273

[22] Filed: Nov. 18, 1987

[30] Foreign Application Priority Data

Nov. 19, 1986 [JP] Japan ................................ 61-274027

[51] Int. Cl.⁴ ............................................. G06F 15/18
[52] U.S. Cl. .................................... 364/513; 364/300
[58] Field of Search ............... 364/300, 513, 200, 900

[56] References Cited

U.S. PATENT DOCUMENTS 4,648,044  3/1987  Hardy et al. ......................... 364/513
4,649,515  3/1987  Thompson et al. .................. 364/900
4,713,775  12/1987 Scott et al. ........................... 364/513
4,752,889  6/1988  Rappaport et al. .................. 364/513

OTHER PUBLICATIONS

Expert Systems Solve Network Problems and Share the Information; Cynar et al.; pp. 187-190; Data Communications, May 1986.
Computers Design Networks by Imitating the Experts; Cynar et al.; pp. 137-141; Data Communications, May 1986.
Expert Systems: the Structure, History, and Future of Successful AI Applications; Miller; pp. 12-15; Oct. 1986; IEEE Potentials.

Primary Examiner—Allen MacDonald
Attorney, Agent, or Firm—Fay, Sharpe, Beall, Fagan, Minnich & McKee

[57] ABSTRACT

In a production system having a memory for storing a group of rules each comprising a condition part and a conclusion part, inference means for inferring by using the group of rules and a working memory, whether a condition part is true or false in the working memory is determined, and if it cannot be determined, a rule having a conclusion part as to whether the fact is true or false is searched, and the conclusion part of the searched rule is used for backward reasoning. If the rule is not found by the search, an inquiry is made to a user.

1 Claim, 4 Drawing Sheets

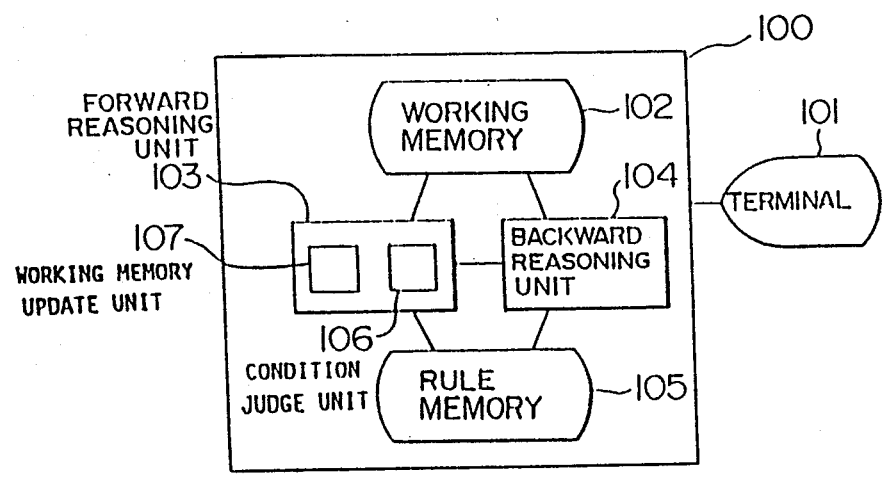
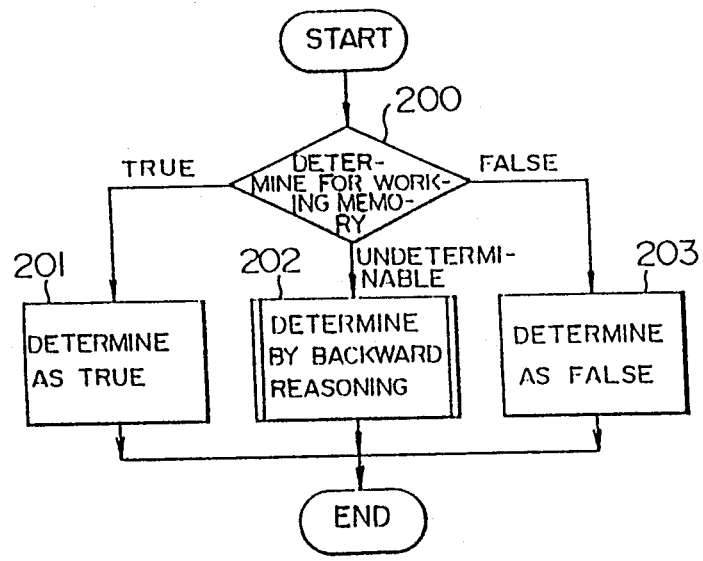
FIG. 2

FIG. 3

```
| ?- forward.                              ← 301
xxx The fact e is true or false ?  ⎫― 302
    Please input 'yes.' or 'no.' . ⎭
>no.                                      ← 303
xxx The fact e is negated !!!
xxx The fact u is true or false ?         ← 304
    Please input 'yes.' or 'no.' .
>yes.
xxx The fact u is asserted !!!
xxx The fact s is asserted !!!     ― 305
xxx The fact t is true or false ?
    Please input 'yes.' or 'no.' .
>no.
xxx The fact t is negated !!!
xxx The fact d is true or false ?
    Please input 'yes.' or 'no.' .
>no.
xxx The fact d is negated !!!
xxx The fact f is true or false ?
    Please input 'yes.' or 'no.' .
>no.
xxx The fact f is negated !!!
xxx The fact a is true or false ?
    Please input 'yes.' or 'no.' .
>yes.
xxx The fact a is asserted !!!
xxx The fact b is asserted !!!
xxx The fact c is asserted !!!
xxx Forward reasoning terminated !
    Concluded facts are following !

fact(not(e)).  ⎫
fact(u).       ⎪
fact(s).       ⎪
fact(not(t)).  ⎬― 306
fact(not(d)).  ⎪
fact(not(f)).  ⎪
fact(a).       ⎪
fact(b).       ⎪
fact(c).       ⎭
yes
| ?-
```

INFERENCE METHOD

BACKGROUND OF THE INVENTION

1. Field of the Invention

The present invention relates to a knowledge engineering system such as an expert system, and more particularly to an inference method suitable when facts are not initially given.

2. Description of the Related Art

As discussed in "LISP" by Winston and Horn, translated by Shirai and Abe, published by Baifu-kan (1982), forward reasoning is designed to operate when one or more facts are initially given, and facts not initially given are determined to be negated.

In the above prior art technique, some facts must be initially entered before inference, and facts not initially entered are interrupted to be negated till they are asserted by the inferencer. Accordingly, correct inference is not attained unless the facts are exactly cited.

SUMMARY OF THE INVENTION

It is an object of the present invention to provide an inference method which is operable without enumerating all of the facts before inference.

The above object is achieved by using backward reasoning to judge for facts necessary in deciding respective conditions, not stored in a working memory and if necessary inquiring to a user for facts not determined by the backward reasoning.

In accordance with the present invention, whether the fact, described in the condition is or is not affirmative, is in or not in the working memory is judged first. If the fact, affirmative or not, is not stored in the working memory, or whether a rule condition is met or not is determined by using a rule to derive the fact, that is, a rule having a conclusion part as to the condition for the fact. If a rule having a conclusion part for a condition of a fact is not found, inquiry is made to the user as to whether the fact is affirmative or not. Since unknown facts are inquired to the user, the forward reasoning can be performed without initially enumerating the facts necessary for inference. Even if a fact is not stored initially in the working memory, if it can be derived from a rule, inquiry is not made to the user. Accordingly, the inference is performed using an effective, efficient inquiry method.

BRIEF DESCRIPTION OF THE DRAWINGS

FIG. 1 shows a block diagram of functional units of one embodiment of the present invention, FIG. 2 shows a flow chart of a process of a decision unit in the embodiment of the present invention, FIG. 3 shows a screen in the operation of the embodiment.

DESCRIPTION OF THE PREFERRED EMBODIMENTS

Figure 4:
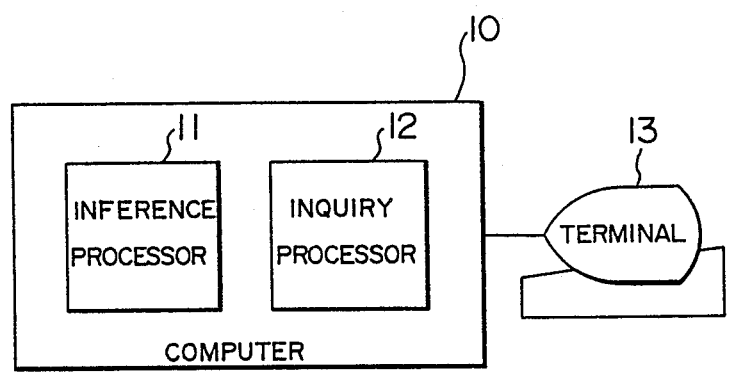
FIG. 4 shows a block diagram of functional units of another embodiment of the present invention.

One embodiment of the present invention is explained with reference to the accompanying drawings.

FIG. 1 shows a block diagram of functional units of one embodiment of the present invention. A computer 100 comprises a working memory 102 for storing facts, a rule memory 105 for storing rules, a forward reasoning unit 103 for writing into the working memory other facts derived from facts in the working memory and rules in the rule memory, and a backward reasoning unit 104 for judging whether the other facts are affirmative or not based on the facts in the working memory and the rule in the rule memory. Inquiry to the user is done through a terminal device 101. The forward reasoning unit comprises a condition judge unit 106 for determining whether the condition of the rule matches with the fact in the working memory or not, and a working memory update unit 107 for writing a conclusion of the rule into the working memory. The functions of the forward reasoning unit 103 and the backward reasoning unit 104 may be attained by one processor or by separate processors.

FIG. 2 shows a flow chart of a process of the condition judge unit 106. In a step 200, whether or not a condition to be judged is met on the working memory is judged, and if it is met, the process proceeds to a step 201, and if it is known that the condition is not met, the process proceeds to a step 203, and if the decision is not clear, the process proceeds to a step 202. In the step 201, it is determined that the condition is met. In the step 202, the decision as to whether the condition is met or not is requested to the backward reasoning unit 104. In the step 203, it is determined that the condition is not met.

An example of process flow of the present invention is explained with reference to a specific program.

The program is described here by using a logic programming language. The logic programming language is described in detail in "Prolog Programming" by W. F. Clocksin and C. S. Mellish, Japan Computer Association (1983).

A program list (1) shown below defines operators used in the present program, and it is a portion of function of the forward reasoning unit 103. In the present program, two operators, "if" and "then" are used. At 1001 of the program list (1), it is designated that the operator "if" is a prefix operator having a priority or precedence 1050. At 1002 of the program list (1), it is designated that the operator "then" is an infix operator having a priority or precedence 1040.

| Program List (1) |
| --- |
| : - op(1050, fx, if). ~ 1001 |
| : - op(1040, xfx, then). ~ 1002 |

A program list (2) attains a function of the forward reasoning. A portion 2001 of the program list (2) is a main program which attains the function of the forward reasoning. At 2002 of the program, one unused and non-redundant rule is selected and predetermined values are entered to a condition part and a conclusion part of the rule. At 2003 of the program, whether the selected rule is a used one or not is checked, and if it is an unused one, a flag is set to indicate the use. At 2004 of the program, whether the selected rule is redundant or not is checked. The redundancy of the rule means that true or false decisions have already been made for all facts appearing in the conclusion part of the rule. In the present program, for simplicity, the fact once concluded is not reversed by other rule. At 2005 of the program, truth/false of the condition part of the rule is determined. Whether the fact described in the condition part is true or false in the working memory is determined, and if it is not determined, the backward reasoning is performed. At 2006 of the program, the conclusion part of the rule is written into the working memory. The facts for which truth/false have been written into the working memory are not written. At 2007 of the program, the fact is written into the working memory and a message is issued to the user.

At 2001 of the program, one of the unused rules for the forward reasoning is selected by 2002 of the program, and whether the condition thereof is met or not is determined by the program portion 2005. If the condition of the selected rule is not met, the process tracks back to the program portion 2002, the flag is reset after the use of the rule and another rule is selected. If a rule whose condition is met is found, the conclusion part of that rule is written into the working memory by the program portion 2006.

| Program List (2) | |
|---|---|
| forward:-<br>get__rule(IF, THEN), solve(IF), !,<br>conclude(THEN), forward.<br>forward:-<br>write('*** Forward reasoning terminated !'), nl, write(' Concluded facts are following !'), nl, listing(fact/1). | ~2001 |
| get__rule(IF, THEN):-<br>(if IF then THEN),<br>gotten__rule__flag(IF, THEN),<br>+redundant (THEN). | ~2002 |
| gotten__rule__flag(IF, THEN):-<br>gotten((if IF then THEN)), !, fail.<br>gotten__rule__flag(IF, THEN):-<br>assert(gotten((if IF then THEN))).<br>gotten__rule__flag(IF, THEN):-<br>retract(gotten((if IF then THEN))), !,<br>fail. | ~2003 |
| redundant((Fact, Rest)):- !,<br>redundant(Fact), redundant(Rest).<br>redundant(Fact):-<br>fact(Fact), !.<br>redundant(not(Fact)):- !,<br>fact(Fact), !.<br>redundant(Fact):-<br>fact(not(Fact)), !. | ~2004 |
| solve((Fact, Rest)):- !,<br>solve(Fact), !, solve(Rest).<br>solve(not(Fact)):-<br>fact(Fact), !, fail.<br>solve(Fact):-<br>fact(Fact), !,<br>solve(Fact):-<br>fact(not(Fact)), !, fail.<br>solve(Fact):-<br>backward(Fact). | ~2005 |
| conclude((Fact, Rest)):- !,<br>conclude(Fact), conclude(Rest).<br>conclude(not(Fact)):-<br>fact(Fact), !.<br>conclude(not(Fact)):-<br>fact(not(Fact)), !.<br>conclude(not(Fact)):- !.<br>assert__fact(fact(not(Fact))).<br>conclude(Fact):-<br>fact(not(Fact)), !.<br>Conclude(Fact):-<br>fact(Fact), !.<br>conclude(Fact):-<br>assert__fact(fact(Fact)). | ~2006 |
| assert__fact(fact(not(Fact))):- !,<br>assert(fact(not(Fact))),<br>write('*The fact'), write(Fact),<br>write('is negated !!!'), nl.<br>assert__fact(fact(Fact)):- !,<br>assert(fact(Fact)),<br>write('*The fact'), write(Fact),<br>write('is asserted !!!'), nl. | ~2007 |

A program list (3) attains a function of the backward reasoning unit 104. The backward reasoning unit 104 uses a program which is shared by the forward reasoning unit 103 and which is contained in the forward reasoning unit. At 3001 of the program, whether a fact is true or not is determined by the backward reasoning. At 3002 of the the program, one of unused rules which has a conclusion for the fact is selected. At 3033 of the program, whether the fact is included in the sequence of facts in the conclusion part is determined. At 3004 of the program, if a user input is other than YES or NO, a correct input is requested. At 3005 of the program, truth/false of the fact is written into the working memory based on the reply inputted by the user.

At the program portion 3001, one of the unused rules which has a conclusion part relating to the fact to be judged in selected, and whether the condition part is met or not is determined by using the program portion 2005 of the program list (2). If it is not met, another rule is selected and the condition part thereof is judged. If it is met, the conclusion part of the rule is written into the working memory by using the program portion 2006 of the program list (2). If the fact cannot be judged by the rule, judgement by the user is requested.

| Program List (3) | |
|---|---|
| backward(not(Fact)):-<br>find__rule(not(Fact), IF, THEN),<br>solve(IF), !, conclude(THEN).<br>backward(not(Fact)):-<br>find__rule(Fact, IF, THEN), solve(IF), !,<br>conclude(THEN), !, fail.<br>backward(not(Fact)):- !,<br>write('*The fact '), write(Fact),<br>write('is true or false ?'), nl,<br>write(' Please input "yes." or "no."'), nl,<br>repeat__until__legal__input, prompt(__, >),<br>read(X), judge(X, Fact), !, X = no.<br>backward(Fact):-<br>find__rule(Fact, IF, THEN), solve(IF), !,<br>conclude(THEN).<br>backward(Fact):-<br>find__rule(not(Fact), IF, THEN),<br>solve(IF), !, conclude(THEN), !, fail.<br>backward(Fact):-<br>write('*The fact '), write(Fact),<br>write('is true or false ?'), nl,<br>write(' Please input "yes." or "no." .'), nl,<br>repeat__until__legal__input,<br>prompt(__, >), read(X), judge(X, Fact),<br>!, X = yes. | ~3001 |
| find__rule(Fact, IF, THEN):-<br>(if IF then THEN),<br>gotten__rule__flag(IF, THEN),<br>include(Fact, THEN). | ~3002 |
| include(Fact, (Fact,-)):- !.<br>include(Fact, (__, Rest)):- !, include(Rest).<br>include(Fact, Fact). | ~3003 |
| repeat__until__legal__input.<br>repeat__until__regal__input:-<br>write('***Please input "yes" or "no. ".'), nl, '!!'), nl,<br>repeat__until__legal__input. | ~3004 |
| judge(yes, Fact):- !,<br>assert__fact(fact(Fact)).<br>judge(no, Fact):- !,<br>assert__fact(fact(not(Fact))). | ~3005 |

A program list (4) shows examples of rules to be processed by the present program, and they are stored in the rule memory 105. A rule 4001 means that "if a is not true, then b is true." A rule 4002 means that "If a is true, then c or d is true." A rule 4003 means that "If e is true, then a is true." A rule 4004 means that "If s and d and f are true, then a is not true." A rule 4005 means that "If u is true, then s is true." A rule 4006 means that "If t is true, then d is two." A rule 4007 means that "If s and f are true, then a is not true, or d is not true." A rule 4008 means that "If d is not true and s is not true, then f is not true or a is not ture.

| Program List (4) |
| --- |
| if a than b. ~4001 |
| if a then c, d. ~4002 |
| if e then a. ~4003 |
| if s, d, f then not (a). ~4004 |
| if u then s. ~4005 |
| if t then d. ~4006 |
| if s, f then not (a), not (d). ~4007 |
| if not (d), not (s) then not (f), not (a). ~4008 |

FIG. 3 shows an example of screen in the run of the present program. In this example, the forward reasoning is done by using the rules of the program list (4) from the state of no fact enumeration. An input line 301 is a start command from the forward reasoning, entered from the terminal device 101 by the user. A message 302 is issued from the inference program of the program lists (1), (2) and (3), and it inquires to the user whether e is true or not. An input line 303 is a reply to the inquiry of the message 302 from the user through the terminal device 101. A message 304 is one from the inference program indicating that e is not true. Besides the user reply, a message is also issued to that whose fact is asserted by the inference, like a message 305. A message 306 enumerates the facts written in the working memory 102 by the forward reasoning. It indicates that e, t, d and f are not true and u, s, a, b and c are true.

In accordance with the present embodiment, the fact necessary for the inference is inquired by the inference program. Accordingly, it is not necessary for the user to input the facts before the inference, and a burden to the user is relieved. When the truth/false of a fact is not clear, it is not required to the user but another fact from which the former fact will be derived is examined by the backward reasoning. Accordingly, the number of times of inquiry is reduced and effective inference is attained.

FIG. 4 shows a block diagram of functional unit of another embodiment of the present invention. A computer 10 comprises an inference processor 11 and an inquiry processor 12, and the computer 10 is utilized by a user through a terminal device 13.

The inquiry processor 12 requests to the user to enter a degree of confidence, and the inference processor 11 infers by using the degree of confidence. If there is unclear matter in the inference, the inference processor 11 requests processing to the inquiry processor 12.

Figure 5:
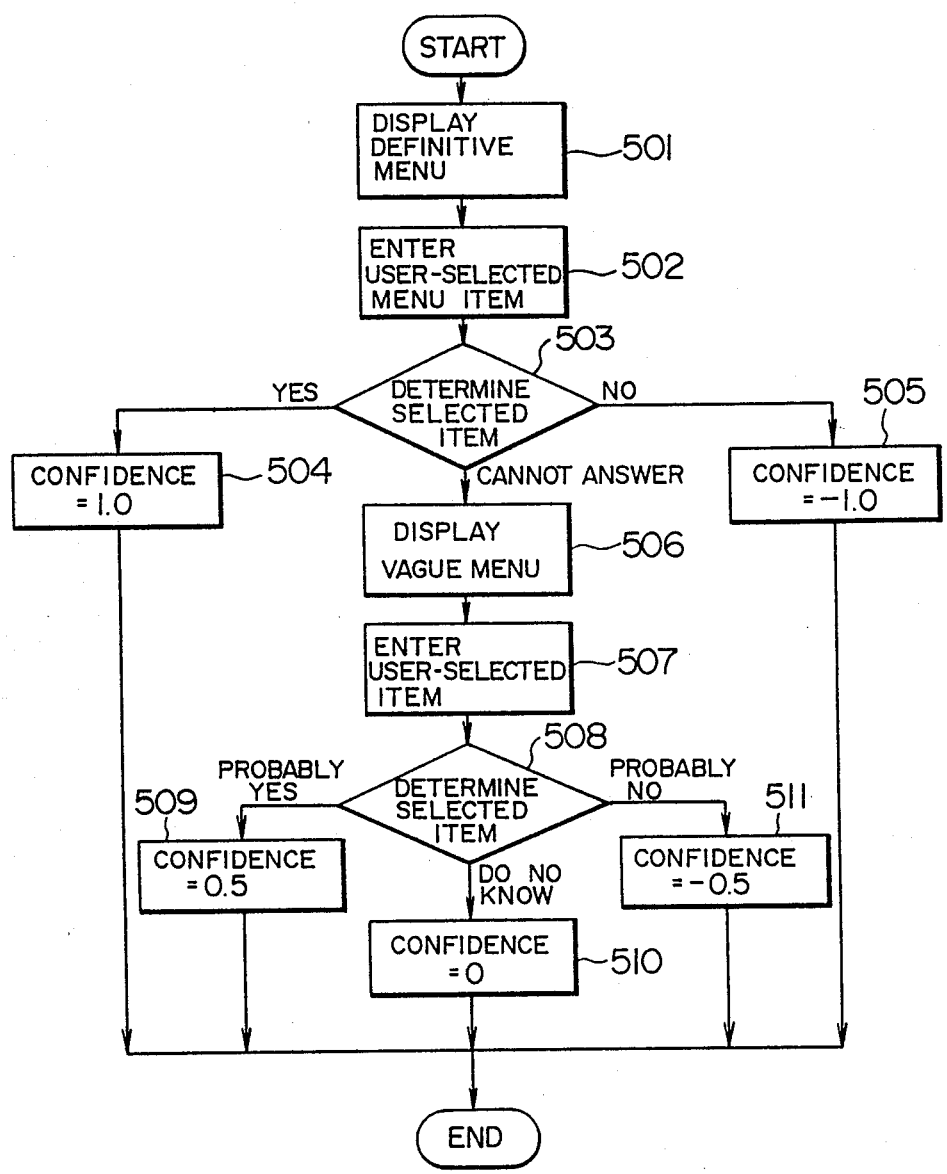
FIG. 5 shows a flow chart of a process of an inquiry processor.

FIG. 5 shows a flow chart of the process of the inquiry processor 12. In a step 501, a definitive menu is displayed. In a step 502, the user selection is inputted. In a step 503, the process is branched in accordance with a menu item selected by the user. If the user selects "YES", the degree of confidence is set to 1.0 in a step 504. If the user selects "NO", the degree of confidence is set to −1.0. If the user selects "CANNOT ANSWER", a vague menu is displayed in a step 506, a user selection is inputted in a step 507, and the process branches in accordance with the user-selected menu item. If the user select "PROBABLY YES", the degree of confidence is set to 0.5 in a step 509. If the user selects "DO NOT KNOW", the degree of confidence is set to 0 in a step 510. If the user selects "PROBABLY NO", the degree of confidence is set to −0.5 in a step 511.

In the present embodiment, the vague menu items are not presented to a clearly definitive event, and the user can reply naturally to a vague event.

In accordance with the present invention, the forward reasoning is performed without initially enumerating all facts. Accordingly, the user is convenienced and a risk of deriving a wrong conclusion due to failure of input of the fact is prevented. The unclear fact in the working memory is not immediately inquired to the user but the fact which can be derived by the backward reasoning is not required. Accordingly, the number of inquiries to the user is reduced. The embodiment is suitable for use in consulation systems such as facsimile assistant systems or medical consulation systems.

We claim:

1. An inference method in a system having a rule memory for storing a group of rules each consisting of a condition part and a conclusion part, a working memory for storing facts, and inference means for deriving facts based on the contents of said rule memory and said working memory, each of said facts representing whether a term is true or false, comprising the steps of:
   determining by matching the contents of said working memory and a term described in the condition part of a rule stored in said rule memory whether said term described in said condition part is true, false, or undeterminable, wherein said determining by matching further includes
      a sub-step of determining whether the condition part of the rule in said rule memory corresponds to the fact in said working memory, and
      a sub-step of writing the conclusion part of the rule into said working memory;
   determining by backward reasoning based on the content of said working memory and said rule memory, if the determining by matching step determines that the term is undeterminable, whether the condition part of the rule in said rule memory having truth or falsehood of said term as the conclusion part is true or false; and,
   inquiring to a user whether the term is true or false, if the rule having as the conclusion part whether the term is true or false, is not in said rule memory.

* * * * *